(12) United States Patent
Yokoyama et al.

(10) Patent No.: US 9,666,902 B2
(45) Date of Patent: May 30, 2017

(54) SOLID ELECTROLYTE, METHOD FOR PRODUCING SOLID ELECTROLYTE, AND LITHIUM-ION BATTERY

(71) Applicant: SEIKO EPSON CORPORATION, Tokyo (JP)

(72) Inventors: Tomofumi Yokoyama, Matsumoto (JP); Tsutomu Teraoka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 122 days.

(21) Appl. No.: 14/520,808

(22) Filed: Oct. 22, 2014

(65) Prior Publication Data
US 2015/0118573 A1    Apr. 30, 2015

(30) Foreign Application Priority Data

Oct. 31, 2013  (JP) ................. 2013-227435

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2220/30* (2013.01); *H01M 2300/0071* (2013.01); *Y02P 70/54* (2015.11)

(58) Field of Classification Search
CPC ......... H01M 10/0525; H01M 10/0562; H01M 10/0585; H01M 10/0565; H01M 2300/0065; H01M 2300/0071
See application file for complete search history.

(56) References Cited

U.S. PATENT DOCUMENTS

| | | | | |
|---|---|---|---|---|
| 6,737,364 | B2 * | 5/2004 | Black | ................... H01L 21/316 257/E21.271 |
| 2003/0228967 | A1 * | 12/2003 | Bitossi | ..................... C03C 8/02 501/10 |
| 2007/0172739 | A1 * | 7/2007 | Visco | ..................... H01M 12/04 429/322 |
| 2011/0059369 | A1 | 3/2011 | Nan et al. | |
| 2011/0318650 | A1 * | 12/2011 | Zhang | ............... H01M 10/0562 429/320 |
| 2014/0252267 | A1 * | 9/2014 | Yan | ......................... C07F 9/091 252/182.1 |

FOREIGN PATENT DOCUMENTS

| | | | |
|---|---|---|---|
| CN | 103199232 A | * | 7/2013 |
| JP | A-2003-346895 | | 12/2003 |
| JP | A-2009-215130 | | 9/2009 |
| JP | A-2011-529243 | | 12/2011 |
| JP | A-2012-195198 | | 10/2012 |

OTHER PUBLICATIONS

Tan et al., "Synthesis of Cubic Phase $Li_7 La_3 Zr_2 O_{12}$ Electrolyte for Solid-State Lithium-Ion Batteries," *Electrochemical and Solid-State Letters*, 2012, vol. 15, No. 3, pp. A37-A39.

\* cited by examiner

*Primary Examiner* — Anca Eoff
(74) *Attorney, Agent, or Firm* — Oliff PLC

(57) ABSTRACT

A solid electrolyte includes a plurality of particles having lithium ionic conductivity and a matrix which is interposed among the particles so as to be in contact with each of the particles and is formed from an amorphous material containing the following (a) and (b): (a) lithium atoms; and (b) an oxide of at least one element selected from the group consisting of boron, a Group 14 element in period 3 or lower, and a Group 15 element in period 3 or lower.

7 Claims, 3 Drawing Sheets

SOLID ELECTROLYTE, METHOD FOR PRODUCING SOLID ELECTROLYTE, AND LITHIUM-ION BATTERY

CROSS-REFERENCE TO RELATED APPLICATION

This application claims a priority to Japanese Patent Application No. 2013-227435 filed on Oct. 31, 2013 which is hereby expressly incorporated by reference in its entirety.

BACKGROUND

1. Technical Field

Several aspects of the present invention relate to a solid electrolyte, a method for producing a solid electrolyte, and a lithium-ion battery.

2. Related Art

As a power source for many electrical apparatuses such as portable information apparatuses, a lithium battery (including a primary battery and a secondary battery) has been used. In particular, as a lithium battery having both of a high energy density and safety, an all-solid-state lithium battery using a solid electrolyte for lithium conduction between positive and negative electrodes has been proposed (see, for example, JP-A-2009-215130 (PTL 1)).

A solid electrolyte can conduct lithium ions without using an organic electrolytic solution, and does not cause leakage of an electrolytic solution or evaporation of an electrolytic solution by heat generation due to driving or the like, and therefore has been drawing attention as a material with high safety.

As such a solid electrolyte to be used in an all-solid-state lithium battery, an oxide-based solid electrolyte having a high lithium ionic conductivity, an excellent insulating property, and high chemical stability has been widely known. As such an oxide, a lithium lanthanum titanate-based material has an especially high lithium ionic conductivity, and therefore has been expected to be applied to batteries.

In the case where such a solid electrolyte is in the form of particles (hereinafter sometimes referred to as "solid electrolyte particles"), the solid electrolyte is often molded to conform to a desired shape by compression molding. However, the solid electrolyte particles are very hard, and therefore, in the resulting molded product, the contact of the solid electrolyte particles with one another is not sufficient to increase the grain boundary resistance, and thus, the lithium ionic conductivity tends to be decreased.

As a method for decreasing the grain boundary resistance, a method in which after solid electrolyte particles are compression-molded, the resulting molded body is sintered at a high temperature of 1000° C. or higher, whereby the particles are welded to one another is known. However, with this method, the composition is liable to be changed due to high temperature heat, and thus it is difficult to produce a solid electrolyte molded body having desired physical properties.

Therefore, as a method for decreasing the grain boundary resistance of a solid electrolyte, a method in which after the surface of each lithium lanthanum titanate particle is coated with $SiO_2$, the particles are sintered at a high temperature has been studied (see, for example, JP-A-2011-529243 (PTL 2)).

On the other hand, as a method for forming a solid electrolyte, a synthesis system using a liquid phase material, particularly a sol-gel method is sometimes adopted. By the sol-gel method, for example, lithium lanthanum titanate can be produced (see, for example, JP-A-2003-346895 (PTL 3)).

However, the above methods have problems as follows. The method disclosed in PTL 2 has a problem that it is difficult to coat the surface of each solid electrolyte particle with $SiO_2$. In addition, by performing firing at a high temperature, lithium is evaporated from the solid electrolyte to be obtained or reacts with a material constituting an electrode to change the composition, and moreover, a large amount of a different phase may be formed. When the firing temperature is decreased for preventing the formation of a different phase, the boundary surface between the particles is not sufficiently sintered, and therefore, the grain boundary resistance cannot be decreased.

The method disclosed in PTL 3 has a problem that since the product forms a uniform layer, and therefore, it is difficult to control the structure of the solid electrolyte particles to be formed, and thus, desired physical properties are hardly obtained.

SUMMARY

An advantage of some aspects of the invention is to provide a solid electrolyte which exhibits a high total ionic conductivity by decreasing the grain boundary resistance. Another advantage of some aspects of the invention is to provide a method for producing a solid electrolyte which exhibits a high total ionic conductivity and has high performance and a lithium-ion battery including such a solid electrolyte.

An aspect of the invention provides a solid electrolyte including a plurality of particles having lithium ionic conductivity and a matrix which is interposed among the particles so as to be in contact with each of the particles and is formed from an amorphous material containing the following (a) and (b): (a) lithium atoms; and (b) an oxide of at least one element selected from the group consisting of boron, a Group 14 element in period 3 or lower, and a Group 15 element in period 3 or lower.

According to this configuration, the particles are connected with one another through the matrix which has lithium ionic conductivity and has a low softening temperature and a low melting point, and therefore, the grain boundary resistance is decreased, and thus, a solid electrolyte exhibiting a high total ionic conductivity can be provided.

The solid electrolyte according to the aspect of the invention may be configured such that each of the particles is coated with the amorphous material.

According to this configuration, the matrix favorably promotes the ion conduction among the particles, and thus, a solid electrolyte having excellent ionic conductivity can be formed. Further, by coating the particles with the matrix, the particles are in contact with one another so that the solid electrolyte can be configured to have no region where a high grain boundary resistance is exhibited.

The solid electrolyte according to the aspect of the invention may be configured such that spaces among the particles are filled with the amorphous material.

According to this configuration, the matrix favorably promotes the ion conduction among the particles, and thus, a solid electrolyte having excellent ionic conductivity can be formed.

The solid electrolyte according to the aspect of the invention may be configured such that the matrix contains the lithium atoms and silicon oxide.

The solid electrolyte according to the aspect of the invention may be configured such that each of the particles is formed from a cubic perovskite-type crystalline material containing at least lithium atoms.

Such a crystalline material can be expected to increase the ionic conductivity of the particles and thus, a solid electrolyte exhibiting a high total ionic conductivity can be formed.

Another aspect of the invention provides a method for producing a solid electrolyte, including: modifying the surface of each of a plurality of particles having lithium ionic conductivity with a dispersant containing an element selected from the group consisting of boron, a Group 14 element in period 3 or lower, and a Group 15 element in period 3 or lower; dispersing the surface-modified particles in a solution containing a lithium compound; gelling the obtained dispersion liquid by removing the solvent from the dispersion liquid; and heating the obtained gel.

According to this method, a solid oxide having excellent lithium ionic conductivity can be easily formed on a desired material surface by disposing the solution on a desired material surface through an arbitrary simple operation such as application or impregnation, followed by gelling and a heat treatment.

The production method according to the aspect of the invention may be configured such that the solution contains a silicone compound or a polyphosphoric acid.

These substances remain in the gel after gelling the dispersion liquid, and further are converted into an oxide constituting the matrix by the heat treatment. When such a compound is contained in the solution, the particles can be easily coated with the matrix, and further, spaces among the particles can be filled with the matrix.

Further, when such a compound is contained in the solution, the spaces filled with the solvent can be prevented from being rapidly lost by the gelling and the heat treatment. Due to this, a solid electrolyte having a higher packing density can be formed.

Still another aspect of the invention provides a lithium-ion battery, including: a positive electrode; a negative electrode; and a solid electrolyte layer which is interposed between the positive electrode and the negative electrode, wherein the solid electrolyte layer is formed from the solid electrolyte according to the aspect of the invention described above.

According to this configuration, the total ionic conductivity of the solid electrolyte layer is high, and a lithium-ion battery having high performance can be formed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Solid Electrolyte

Hereinafter, with reference to FIGS. 1 to 3, a solid electrolyte and a method for producing a solid electrolyte according to this embodiment will be described. In all the drawings described below, in order to make the drawings easily viewable, the dimension, the ratio, etc. of each constituent member is made appropriately different from those of the actual one.

Figure 1:
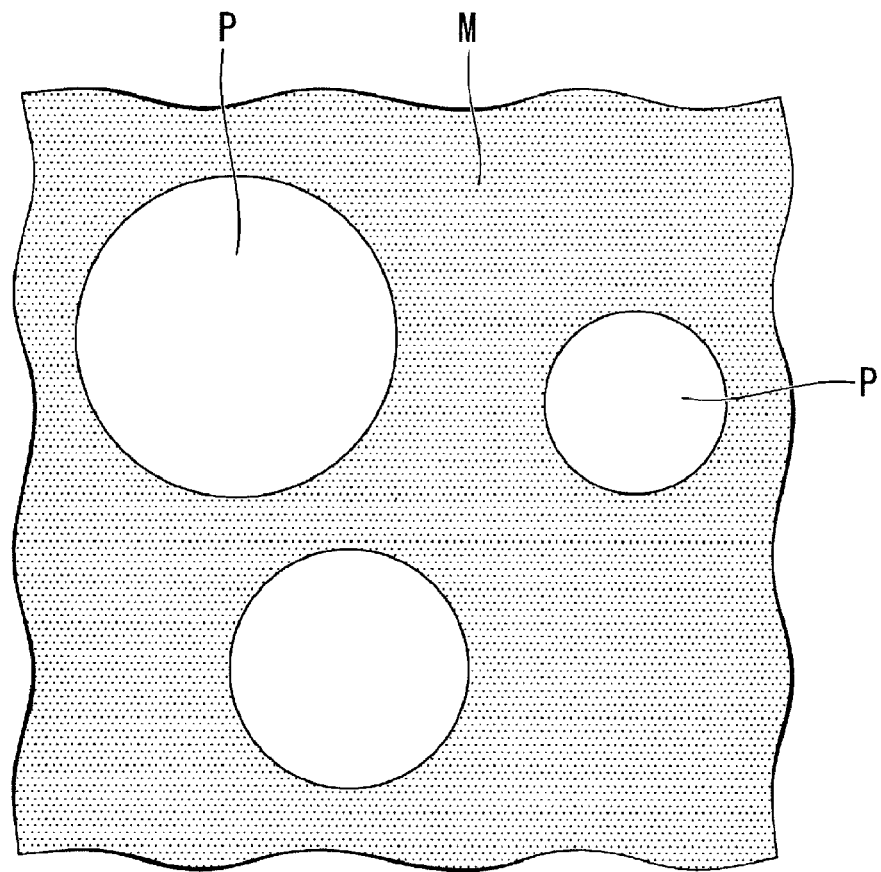
FIG. 1 is a schematic view of a solid electrolyte according to an embodiment.

FIG. 1 is a schematic view of a solid electrolyte according to this embodiment, and is a cross-sectional view of the solid electrolyte at an arbitrary position. As shown in FIG. 1, the solid electrolyte of this embodiment includes a plurality of particles P formed from a crystalline material and a matrix M formed from an amorphous material.

The particles P have lithium ionic conductivity. The particles P may be formed from a cubic perovskite-type crystalline material.

The crystalline material constituting the particles P may be a composite oxide represented by the compositional formula $ABO_3$. Here, in the formula, A and B represent metal elements different from each other, and A includes Li, and further includes at least one element selected from the group consisting of La, Mg, and Ba, and B is at least one element selected from the group consisting of Ti, Ta, Zr, and Al.

Such a crystalline material can be expected to increase the ionic conductivity of the particles P and thus, a solid electrolyte exhibiting a high total ionic conductivity can be formed.

As the particles P of this embodiment, $Li_{0.35}La_{0.55}TiO_3$, $Li_7La_3Zr_2O_{12}$, $Li_{1.5}Al_{0.5}Ti_{1.5}(PO_4)_3$, $Li_2SiO_3$, $Li_4SiO_4$, $Li_3BO_3$, $Li_3PO_4$, $Li_2O$—$SiO_2$—$P_2O_5$, or the like can be used.

The particles P may be amorphous.

The matrix M is a region interposed among the particles P and is formed from an amorphous material containing the following (a) and (b): (a) lithium atoms; and (b) an oxide of at least one element selected from the group consisting of boron, a Group 14 element in period 3 or lower, and a Group 15 element in period 3 or lower.

The "Group 14 element in period 3 or lower" is specifically Si, Ge, Sn, or Pb. Among them, Si is preferred.

The "Group 15 element in period 3 or lower" is specifically P, As, Sb, or Bi. Among them, P is preferred.

Such a matrix M has lithium ionic conductivity, and therefore can be made to function as an ion conductor.

It is preferred that the matrix M preferably coats the surface of each particle P. According to this configuration, the matrix M favorably promotes the ion conduction among the particles P, and thus, a solid electrolyte having excellent ionic conductivity can be formed. Further, by coating the particles P with the matrix M, the particles P are in contact with one another so that the solid electrolyte can be configured to have no region where a high grain boundary resistance is exhibited.

Further, the matrix M is preferably filled in spaces among the particles P. According to this configuration, the matrix M favorably promotes the ion conduction among the particles P, and thus, a solid electrolyte having excellent ionic conductivity can be formed.

It is preferred that the matrix M contains, for example, lithium atoms and silicon oxide.

Method for Producing Solid Electrolyte

Figure 2:
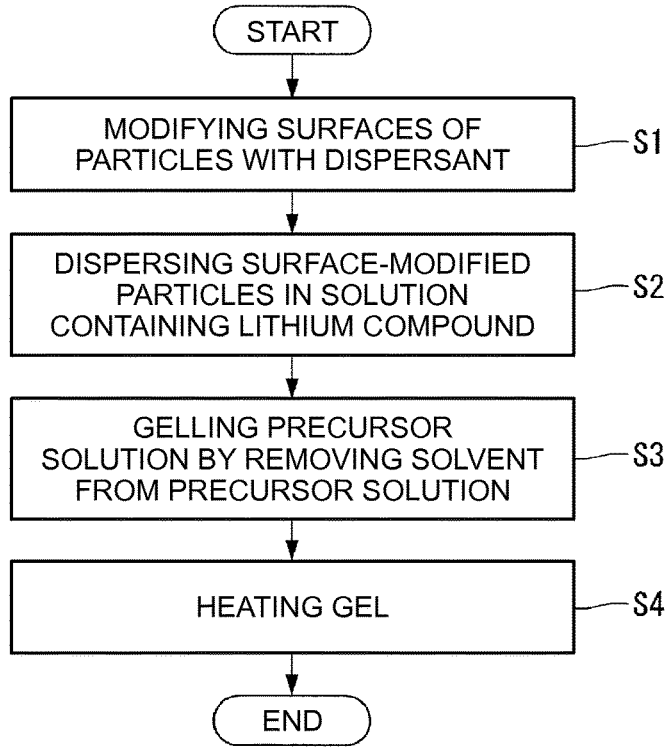
FIG. 2 is a flowchart showing a method for producing a solid electrolyte according to an embodiment.

FIG. 2 is a flowchart showing a method for producing a solid electrolyte according to this embodiment. Hereinafter, with reference to FIG. 2 along with FIG. 1, the production method will be described using the reference symbols shown in FIG. 1.

The method for producing a solid electrolyte of this embodiment includes (1) a surface modification step in which the surface of each of a plurality of particles having lithium ionic conductivity is modified with a dispersant containing an element selected from the group consisting of boron, a Group 14 element in period 3 or lower, and a Group 15 element in period 3 or lower, (2) a dispersion step in which the surface-modified particles are dispersed in a solution containing a lithium compound, (3) a gelling step in which the obtained dispersion liquid is gelled by removing the solvent from the dispersion liquid, and (4) a heat treatment step in which the obtained gel is heated.

Here, the production method will be described assuming that an organosilicon compound is used as the dispersant.

1. Surface Modification Step

First, the surface of each of a plurality of particles having lithium ionic conductivity is modified with a dispersant containing an element selected from the group consisting of boron, a Group 14 element in period 3 or lower, and a Group 15 element in period 3 or lower (Step S1).

As the dispersant, an organic compound containing at least one element selected from the group consisting of boron, a Group 14 element in period 3 or lower, and a Group 15 element in period 3 or lower, and having an organic group and a functional group capable of forming a chemical bond on the surface of the particle can be used.

As the organic group, an alkyl group or an aryl group can be used. As the alkyl group, either a linear or branched alkyl group can be used, however, a linear alkyl group is preferred. As the alkyl group, for example, a linear saturated alkyl group having 6 to 20 carbon atoms can be used, and an octadecyl group can be preferably used.

Examples of the aryl group may include a group obtained by removing one hydrogen atom from a monocyclic aromatic compound such as a phenyl group or a tolyl group, a group obtained by removing one hydrogen atom from a bicyclic aromatic compound such as a naphthyl group, and a group obtained by removing one hydrogen atom from a heterocyclic compound having a thiophene ring, a pyridine ring, or the like.

Examples of the "functional group capable of forming a chemical bond on the surface of the particle" may include an alkoxy group and a halogen atom.

As the dispersant having such groups, an organoboron compound, an organosilicon compound, or an organophosphorus compound can be preferably used. Specific examples thereof may include octadecyltriethoxysilane and octadecylphosphonic acid, and octadecyltriethoxysilane is preferred.

The surface treatment is performed by adding the particles P and the dispersant to a dispersion medium and heating the mixture while stirring. As the dispersion medium, a variety of types of dispersion media can be used as long as the media do not react with the dispersant and the particles P during the surface treatment. For example, the surface treatment can be performed by adding the particles P and octadecyltriethoxysilane to n-hexadecane, and stirring the mixture while heating at 180° C.

2. Dispersion Step

Subsequently, the surface-modified particles are dispersed in a solution containing a lithium compound (Step S2).

Examples of the lithium compound to be contained in the solution may include inorganic salts such as LiOH, LiF, LiBr, LiCl, LiNO$_3$, and Li$_2$SO$_4$; organic acid salts such as lithium formate (LiHCOO), lithium acetate (LiCH$_3$COO), LiC$_2$H$_3$O$_3$, lithium citrate (Li$_3$C$_6$H$_5$O$_7$), LiC$_7$H$_5$O$_2$, and LiC$_{18}$H$_{35}$O$_2$; organic lithium compounds such as methyllithium (CH$_3$Li), butyllithium (LiC$_4$H$_9$), and phenyllithium (C$_6$H$_5$Li); and lithium alkoxides such as lithium methoxide (LiOCH$_3$), lithium ethoxide (LiOC$_2$H$_5$), and lithium propoxide (LiOC$_3$H$_7$).

The alkoxy group constituting the lithium alkoxide may be linear or branched.

As the solvent in the "solution containing a lithium compound", a polar solvent which dissolves a lithium compound can be used, and examples thereof may include alcohols such as ethanol.

Further, in the "solution containing a lithium compound", a compound including an element selected from the group consisting of boron, a Group 14 element in period 3 or lower, and a Group 15 element in period 3 or lower may be dissolved.

3. Gelling Step

Subsequently, the obtained dispersion liquid is gelled by removing the solvent from the dispersion liquid (Step S3).

For example, a precursor solution is heated to 140° C. and maintained as such for 1 hour, whereby a transparent gel is obtained.

This step and the subsequent heat treatment step may be performed successively.

4. Heat Treatment Step

Subsequently, the obtained gel is heated, whereby a solid oxide is obtained (Step S4).

By performing the heat treatment, an oxide of each element is generated from boron, a Group 14 element in period 3 or lower, and a Group 15 element in period 3 or lower, thereby forming the matrix M. Further, lithium atoms derived from the lithium compound is contained in the gel, and therefore, the oxide is vitrified (amorphized) at a lower temperature as compared with the case where the lithium compound is not contained.

For example, a technique in which calcium is added for decreasing the solidifying point in the production of glass is known. However, when sodium, calcium, or the like is added to the matrix M according to the invention for trying to obtain the same effect, the lithium ionic conductivity is decreased due to the "mixed alkali effect" so that the performance as a solid electrolyte is decreased. Therefore, a method in which sodium, calcium, or the like is added to the matrix M for expecting to be able to perform the heat treatment at a low temperature cannot be adopted.

On the other hand, in this embodiment, the lithium compound is added to the matrix M, and therefore, the matrix M can be vitrified (amorphized) at a low temperature without causing the above-described competitive inhibition.

Further, lithium atoms contained in the matrix M contribute to the lithium ion conduction.

Therefore, the matrix M obtained in this manner favorably conducts lithium ions, and further can be amorphized at a lower temperature than in the related art.

The heat treatment temperature may be higher than the fusion pyrolysis temperature of the lithium compound to be contained in the solution and lower than the reaction start temperature of lithium ions and the matrix M.

For example, when lithium nitrate (LiNO$_3$) is used as the lithium compound, since the fusion pyrolysis temperature of LiNO$_3$ is 400° C., the heat treatment may be performed at a temperature higher than 400° C.

If the heat treatment temperature is low such that it is lower than the fusion pyrolysis temperature of the lithium compound, the dispersant on the surface of the particle P is not sufficiently oxidized, and therefore is liable to remain on the surface of the particle P as the dispersant which is an organic compound. In this case, an organic material layer having a high resistance is formed on the surface of the particle P, and thus, such a case is not preferred.

In the case where the oxide of a Group 14 element to be contained in the matrix M is silicon oxide, the temperature, at which LiNO$_3$ and silicon oxide are reacted with each other to form lithium silicate having a low lithium ionic conductivity, is 450° C. or higher, and therefore, the heat treatment may be performed at a temperature lower than 450° C.

A solid-phase reaction between a generally known electrode active material and an oxide to be used as a solid electrolyte requires a temperature of 800° C. or higher. Due to this, in the heat treatment performed at the above-described temperature, even if the electrode active material is in contact with the oxide, the possibility of causing a solid phase reaction is very low. Therefore, it is also possible to suppress a harmful effect such as high temperature sintering while decreasing the grain boundary resistance.

In this manner, a solid electrolyte having crystalline particles P and an amorphous matrix M interposed among the particles P is obtained.

In a method for producing a solid electrolyte of this embodiment, as described above, the surfaces of the particles P are treated with a dispersant, a dispersion liquid obtained by dispersing the particles P is gelled, followed by a heat treatment, whereby a solid electrolyte having crystalline particles P and an amorphous matrix M can be favorably produced.

Further, the dispersant with which the surfaces of the particles P are modified contains an element selected from the group consisting of boron, a Group 14 element in period 3 or lower, and a Group 15 element in period 3 or lower serving as a component of the matrix M, and therefore, the matrix M formed after the heat treatment and the particles P are favorably bonded to each other, whereby the resistance at the boundary surface can be decreased.

Therefore, a solid electrolyte having excellent lithium ionic conductivity can be easily formed on a desired material surface by, for example, disposing the solution on a desired material surface through an arbitrary simple operation such as application or impregnation, followed by gelling and a heat treatment.

According to the solid electrolyte having a configuration as described above, a solid electrolyte which exhibits a high total ionic conductivity by decreasing the grain boundary resistance can be provided.

In addition, according to the method for producing a solid electrolyte having a configuration as described above, a solid electrolyte which exhibits a high total ionic conductivity and has high performance can be produced.

In this embodiment, only a case where as the solvent in the "solution containing a lithium compound", a polar solvent is used is described, however, the solution may further contain a silicone compound or a polyphosphoric acid.

These substances remain in the gel after gelling the dispersion liquid, and further are converted into an oxide constituting the matrix M by the heat treatment. When such a compound is contained in the solution, the particles P can be easily coated with the matrix M, and further, spaces among the particles P can be filled with the matrix M.

Further, when such a compound is contained in the solution, the spaces filled with the solvent can be prevented from being rapidly lost by the gelling and the heat treatment. Due to this, a solid electrolyte having a higher packing density can be formed. Further, since a change in volume of the silicone compound is small before and after the heat treatment, the resulting solid electrolyte is hardly broken, and therefore, the silicone compound is favorable.

It is also possible to use, as the particles P, at least one or more types of fine particles of oxides such as $B_2O_3$, MgO, $Al_2O_3$, $SiO_2$, $P_2O_5$, a transition metal oxide, and a composite oxide.

Lithium-Ion Battery

Next, a lithium-ion battery according to this embodiment will be described. FIG. 3 is a cross-sectional view showing a lithium-ion battery according to this embodiment.

Figure 3:
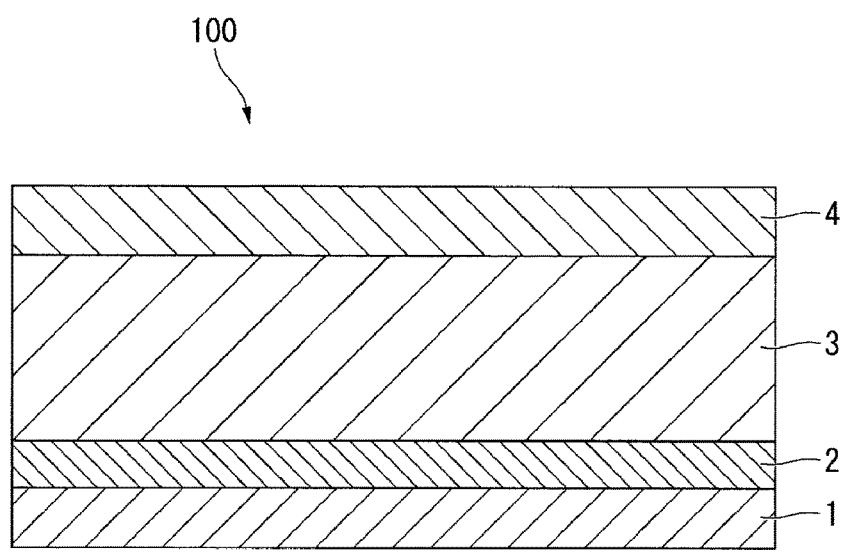
FIG. 3 is a cross-sectional view showing a lithium-ion battery according to an embodiment.

A lithium-ion battery 100 shown in FIG. 3 has a structure in which a current collector 1, an active material layer 2, a solid electrolyte layer 3, and an electrode 4 are laminated in this order. The solid electrolyte layer 3 uses the above-described solid electrolyte as a forming material.

As a forming material of the current collector 1, one type of metal (a metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), or an alloy containing two or more types of metal elements selected from this group can be used.

As the shape of the current collector 1, a plate, a foil, a mesh, etc. can be adopted. The surface of the current collector 1 may be smooth, or may have irregularities formed thereon.

In the lithium-ion battery 100, the forming material of the active material layer 2 is different between the case where the current collector 1 is used on the positive electrode side and the case where it is used on the negative electrode side.

In the case where the current collector 1 is used on the positive electrode side, a material generally known as a positive electrode active material can be used as the forming material of the active material layer 2. Examples of such a material include a lithium composite oxide.

Examples of such a lithium composite oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$. $Li_2CuO_2$, $LiFeF_3$, $Li_2FeSiO_4$, and $Li_2MnSiO_4$. Further, a solid solution obtained by substituting some atoms in a crystal of any of these lithium composite oxides with a transition metal, a typical metal, an alkali metal, an alkaline rare earth element, a lanthanoid, a chalcogenide, a halogen, or the like can also be used as the positive electrode active material.

In the case where the current collector 1 is used on the negative electrode side, a material generally known as a negative electrode active material can be used as the forming material of the active material layer 2.

Examples of the negative electrode active material include silicon-manganese alloy (Si—Mn), silicon-cobalt alloy (Si—Co), silicon-nickel alloy (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), tin (Sn)-doped indium oxide (ITO), aluminum (Al)-doped zinc oxide (AZO), gallium (Ga)-doped zinc oxide (GZO), antimony (Sb)-doped tin oxide (ATO), fluorine (F)-doped tin oxide (FTO), a carbon material, a material obtained by intercalating lithium ions into layers of a carbon material, anatase-type titanium dioxide ($TiO_2$), lithium composite oxides such as $Li_4Ti_5O_{12}$ and $Li_2Ti_3O_7$, and lithium (Li) metal.

In the case where the current collector 1 is used on the positive electrode side, the electrode 4 serves as a negative electrode. In this case, as the forming material of the current collector 1, aluminum can be selected, and as the forming material of the electrode 4, lithium can be selected.

Such a lithium-ion battery 100 can be produced as follows.

First, the current collector 1 having the active material layer 2 formed on the surface thereof is prepared, the above-described precursor solution is applied to the surface of the active material layer 2, and the precursor solution is gelled, followed by a heat treatment, whereby the solid electrolyte layer 3 having excellent lithium ionic conductivity is easily formed on the surface of the active material layer 2.

The heat treatment temperature for obtaining the solid electrolyte layer 3 at this time is preferably 540° C. or higher and 800° C. or lower as described above. When the heat treatment is performed within such a temperature range, a material constituting the active material layer 2 and a solid oxide formed by the heat treatment do not react with each other so that a different phase is not formed, and thus, a desired solid electrolyte layer can be easily formed.

Subsequently, the electrode 4 is formed on the surface of the solid electrolyte layer 3. By doing this, the lithium-ion battery 100 can be easily produced.

Other than this configuration, the method for producing the lithium-ion battery 100 may also be configured such that a member in which a solid electrolyte layer is formed on the surface of the active material layer 2 and a member in which a solid electrolyte layer is formed on the surface of the electrode 4 are produced, respectively, and the solid electrolyte layers of the members are bonded to each other.

According to such a lithium-ion battery, the total ionic conductivity of the solid electrolyte layer is high, and a lithium-ion battery having high performance can be formed.

Hereinabove, preferred embodiments according to the invention are described with reference to the accompanying drawings, however, it is needless to say that the invention is not limited to the embodiments. The shapes of the respective constituent members, combinations thereof, etc. described in the above-described embodiments are merely examples and various modifications can be made based on design requirements, etc. without departing from the gist of the invention.

In the above embodiments, a case where the oxide particles according to the invention are used as a forming material of the solid electrolyte layer of the lithium-ion battery is described, however, the invention is not limited thereto, and for example, it is also possible to use the oxide particles as a forming material of a solid electrolyte layer of a lithium air battery.

EXAMPLES

Hereinafter, the invention will be described with reference to Examples, however, the invention is not limited to these Examples.

Example 1

By using a planet ball mill, $Li_{0.35}La_{0.55}TiO_3$, (Kojundo Chemical Lab. Co., Ltd.) was ground, whereby particles having a volume fraction median diameter of 200 nm were prepared.

Subsequently, 1 g of $Li_{0.35}La_{0.55}TiO_3$ particles and 0.05 g of octadecyltriethoxysilane (AZmax Co., Ltd.) were added to 10 mL of n-hexadecane, and the resulting mixture was heated at 180° C. for 2 hours while stirring at 300 rpm using a hot plate with a magnetic stirrer.

Subsequently, by using a centrifuge cooled to 10° C., the resulting mixture was centrifuged at 15000 rpm for 10 minutes to precipitate the particles. After the supernatant was removed, the particles were redispersed in 10 mL of n-hexadecane, and the resulting mixture was centrifuged again under the same condition. The supernatant was removed, and the thus obtained precipitate was dispersed in 10 mL of n-hexadecane, whereby a dispersion liquid of the surface-treated particles was obtained.

Subsequently, in 10 mL of the obtained dispersion liquid, 0.28 g of tetraethoxysilane (Kojundo Chemical Lab. Co., Ltd.) was mixed. Further, 0.138 g of $LiNO_3$ (Kanto Chemical Co., Inc.) was dissolved in 2 mL of ethanol, and the resulting solution was also added to the same dispersion liquid.

Subsequently, the thus obtained dispersion liquid was heated at 450° C. for 1 hour in the air atmosphere, whereby a white solid was obtained.

After the thus obtained product was ground in an agate mortar, 100 mg of the ground material was packed in a pellet die having an inner diameter of 10 mm and pressed at a pressure of 624 MPa, whereby a tablet-shaped pellet having a thickness of 0.5 mm was obtained. The thus obtained pellet was fired at 450° C. for 4 hours in the air atmosphere, whereby a solid electrolyte molded body was obtained.

Example 2

A solid electrolyte molded body was obtained in the same manner as in Example 1 except that $Li_7La_3Zr_2O_{12}$ fine particles synthesized with reference to a non-patent literature (Electrochemical and Solid-State Letters, 15 (3) A37-A39 (2012)) were used as the particles.

Comparative Example 1

A solid electrolyte molded body was obtained in the same manner as in Example 1 except that $SiO_2$ (manufactured by Sigma-Aldrich Corporation) particles having a median diameter of 200 nm were used as the particles.

Comparative Example 2

A solid electrolyte molded body was obtained in the same manner as in Example 1 except that $TiO_2$ (manufactured by Sigma-Aldrich Corporation) particles having a median diameter of 200 nm were used as the particles.

Measurement of Ionic Conductivity

A Pt electrode was formed on the surface of each of the obtained solid electrolyte molded bodies by sputtering, and the ionic conductivity thereof was analyzed using an AC impedance analyzer (model 1620, manufactured by Solartron Co., Ltd.).

The measurement results are shown in the following Table 1.

TABLE 1

| | Fine particles | Total ionic conductivity (S/cm) |
|---|---|---|
| Example 1 | $Li_{0.35}La_{0.55}TiO_3$ | $2.4 \times 10^{-4}$ |
| Example 2 | $Li_7La_3Zr_2O_{12}$ | $9.4 \times 10^{-5}$ |
| Comparative Example 1 | $SiO_2$ | $8.3 \times 10^{-6}$ |
| Comparative Example 2 | $TiO_2$ | $1.9 \times 10^{-5}$ |

It was found based on the measurement results that the solid electrolyte molded bodies of Examples 1 and 2 exhibit a higher total ionic conductivity than those of Comparative Examples 1 and 2, and therefore are preferred as a solid electrolyte.

Example 3

A solid electrolyte molded body was obtained in the same manner as in Example 1 except that 0.28 g of octadecyltriethoxysilane was used, and 4 mL of silicone (KF-96-10cs, Shin-Etsu Silicone Co., Ltd.) and 3 mL of indane were added in place of 0.28 g of tetraethoxysilane (Kojundo Chemical Lab. Co., Ltd.).

The ionic conductivity of the thus obtained solid electrolyte molded body was measured in the same manner as in Example 1, and the total ionic conductivity was $2.1 \times 10^{-4}$ S/cm.

Comparative Example 3

A solid electrolyte molded body was obtained in the same manner as in Example 1 except that $LiNO_3$ was not added.

The ionic conductivity of the thus obtained solid electrolyte molded body was measured in the same manner as in Example 1, and the total ionic conductivity was $3.4 \times 10^{-6}$ S/cm.

Figure 4:
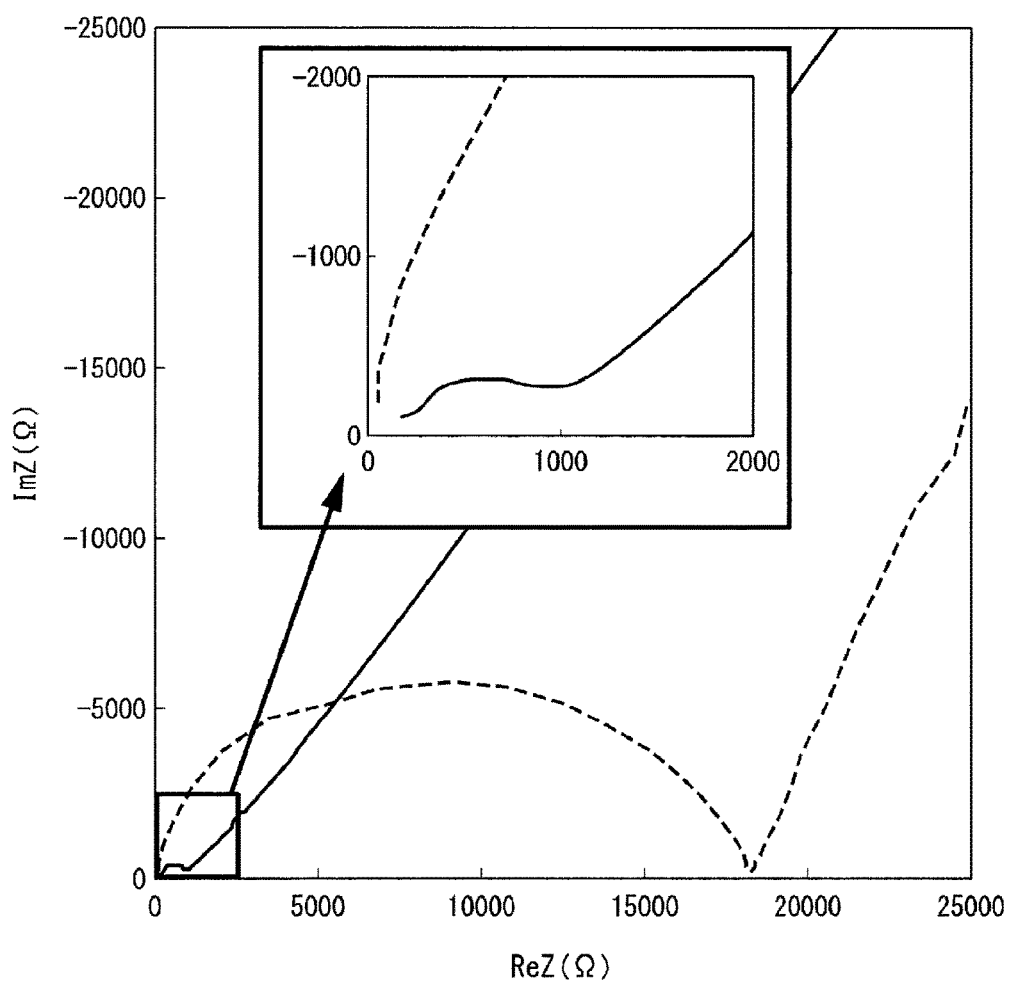
FIG. 4 is a graph showing measurement results of examples.

FIG. 4 is a Nyquist plot of an AC impedance spectrum measured for each of the solid electrolytes of Example 1 and Comparative Example 3. In the graph, the abscissa represents a real impedance component (unit: $\Omega$), and the ordinate represents an imaginary impedance component (unit: $\Omega$). Further, in the graph, the solid line shows the result of Example 1, and the broken line shows the result of Comparative Example 3.

As shown in the graph, the sum of the bulk ion conductive component of $Li_{0.35}La_{0.55}TiO_3$ and the bulk ion conductive component of the matrix was confirmed in a high-frequency region in both cases, however, it was found that the bulk resistance is significantly increased in Comparative Example 3 in which a lithium compound is not contained in the matrix.

It could be confirmed based on the above results that the invention is useful.

What is claimed is:

1. A solid electrolyte, comprising:
   a plurality of particles having lithium ionic conductivity; and
   a matrix which is in contact with each of the particles and is formed from a material containing the following (a) and (b):
   (a) lithium atoms; and
   (b) an oxide of at least one element selected from the group consisting of boron, a Group 14 element in period 3 or lower, and a Group 15 element in period 3 or lower,
   wherein a surface of each of the particles is modified with a dispersant containing the at least one element selected from the group consisting of boron, a Group 14 element in period 3 or lower, and a Group 15 element in period 3 or lower.

2. The solid electrolyte according to claim 1, wherein each of the particles is coated with the material.

3. The solid electrolyte according to claim 1, wherein spaces among the particles are filled with the material.

4. The solid electrolyte according to claim 1, wherein the matrix contains the lithium atoms and silicon oxide.

5. The solid electrolyte according to claim 1, wherein each of the particles is formed from a crystalline material with a cubic perovskite structure, the crystalline material containing at least lithium atoms.

6. A lithium-ion battery, comprising:
   a positive electrode;
   a negative electrode; and
   a solid electrolyte layer which is interposed between the positive electrode and the negative electrode,
   wherein the solid electrolyte layer is formed from the solid electrolyte according to claim 1.

7. The solid electrolyte according to claim 1, wherein the surface of each of the particles is modified with the dispersant by adding the particles and the dispersant to a dispersion medium comprising n-hexadecane, and stirring the resulting mixture while heating.

* * * * *